Oct. 29, 1940.   E. A. FORSBERG   2,219,952
PULSATOR OF BELLOWS TYPE
Filed Jan. 17, 1939
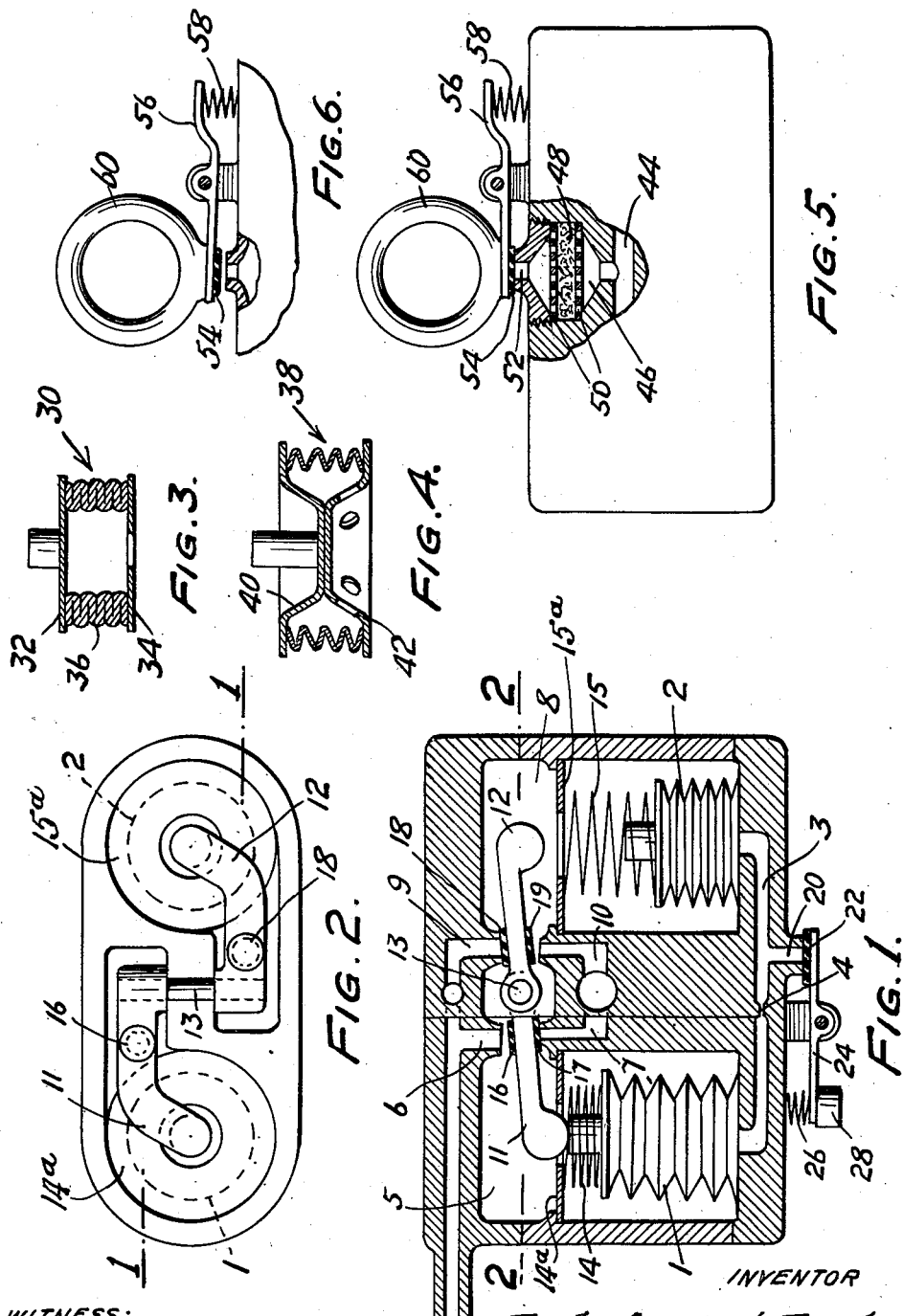
INVENTOR
Erik August Forsberg Patented Oct. 29, 1940

2,219,952

UNITED STATES PATENT OFFICE 2,219,952

PULSATOR OF BELLOWS TYPE

Erik August Forsberg, Nockeby, Sweden, assignor to The De Laval Separator Company, New York, N. Y., a corporation of New Jersey Application January 17, 1939, Serial No. 251,289
In Sweden February 2, 1938

5 Claims. (Cl. 31—61)

This invention relates to a pulsator of bellows type compensated for variations in temperature and/or pressure.

In the case of pulsators of so-called bellows type, and particularly those designed for milking machines, the rate of pulsation is regulated by a fluid which flows to and fro between two containers the volume of which can be changed and the changes of volume of which provide control of members regulating the distribution of pressure within the pulsator and, directly or indirectly, within the milking elements.

If the fluid used is a gas such as air, the arrangement has the drawback that the rate of pulsation is dependent on temperature and pressure. If the pulsator is regulated to give a certain rate of pulsation at a given temperature and at a given height of the barometer, the rate will increase with rise of temperature and fall in height of the barometer, and the rate will decrease with falling temperature and rising height of the barometer. The variations due to temperature may be compensated to a considerable degree by using elements in the construction which are sensitive to differences of temperature. The variations due to pressure may be theoretically compensated in a manner similar in principle to the compensation for variations of temperature, but the constructions which are necessary are not suitable for practical use.

The present invention relates to means by which a practically sufficient compensation is obtained in a simple manner for variations of both temperature and pressure, both independently and in combination.

Both the broad and specific objects of the invention in the attainment of this end will be apparent from the following description, read in conjunction with the accompanying drawing, in which:

Figure 1 shows in diagrammatic section the operative arrangement of the principal elements of a milking machine pulsator, this figure being a vertical section taken on the broken plane the trace of which is indicated at 1—1 in Figure 2;

Figure 2 is a section of the same taken on the plane the trace of which is indicated at 2—2 in Figure 1;

Figure 3 is a sectional view illustrating one means for preventing too great a collapse of the bellows;

Figure 4 is a sectional view showing modified means for preventing too great collapse of the bellows;

Figure 5 is an elevation, partly in section, showing an automatic equalization arrangement, together with filtering means; and Figure 6 is a similar, but fragmentary, view, showing the valve of Figure 5 in open position.

In the drawing there are illustrated at 1 and 2 air filled bellows in communication with each other through a passage 3 having a restricted portion 4. Bellows 1 is enclosed in a chamber 5 from which a port 6 leads to a source of subatmospheric pressure and from which a port 7 leads to the atmosphere. Bellows 2 is enclosed in a similar chamber 8 from which ports 9 and 10 lead, respectively, to the source of sub-atmospheric pressure and to the atmosphere.

In the upper parts of these respective chambers, there are levers 11 and 12 connected together by a rock shaft 13 passing through a partition between the chambers. These levers have on them soft valves indicated at 16, 17, 18 and 19 which are adapted, when the levers are at one end of their movement, to close ports 7 and 9, and when at the other end of their movement to close ports 6 and 10. It will be noted that the ports 6 and 9 are much larger than ports 7 and 10 for a reason which will be described.

Springs 14 and 15, abutting against plates 14a and 15a, held by shoulders in the body, urge, respectively, the bellows to a collapsed condition, but, as pointed out later, the collapse of each of these bellows is limited, so that even when fully collapsed it will contain a substantial amount of air.

With the parts in the position shown in Figure 1, air is being exhausted from the chamber 5 and bellows 1 is being gradually expanded by air flow through channel 3 and restriction 4 from bellows 2, which is surrounded with air at atmospheric pressure. When bellows 1 is expanded to such extent as to engage lever 11, it will be stopped until enough pressure builds up inside it to overcome the differential pressures which exist by reason of the closure of the vacuum port 9 by valve 18 and the atmospheric port 7 by valve 17 and the existence of partial vacuum in chamber 5 and atmospheric pressure in chamber 8. When sufficient pressure has been built up to break the valve 18 away from port 9, the levers will snap open to a position opening ports 7 and 9 and closing ports 6 and 10. Bellows 1 will then be surrounded by air at atmospheric pressure and will be compressed, while bellows 2 will be surrounded with air at sub-atmospheric pressure and will expand until it forces lever 12 upwardly, whereupon the cycle will be repeated.

The rate of pulsation is thus determined by the time required for a bellows to swell from the minimum volume to a reversing volume. If the temperature rises and/or the height of the barometer drops, the volume of the air enclosed in the bellows would be effectively increased, and consequently, the increase of volume required for reversing the levers becomes less; with falling temperature and/or rising height of the barometer, the reverse conditions prevail. In the former case, the rate of pulsation will increase and in the latter it will decrease.

The springs 14 and 15 are so chosen that they can compress the bellows against the frictional resistance opposing movement of the bellows without, however, generating any harmful overpressure on the bellows. In order to reduce the effect of changes of temperature to a minimum, the bellows are so formed that, under the action of springs 14 and 15, when they are fully compressed they still have substantial residual volume. This end can be achieved, for example, by the construction in Figure 3, in which the bellows take the form indicated at 30, provided with upper and lower ends 32 and 34 and having the walls so made that under compression they will fill the space between the ends and thus limit the extent to which they may approach each other. Alternatively, as illustrated in Figure 4, a bellows such as 38 may be used, the ends of which are dished as indicated at 40 and 42 so as to engage each other at their central portions, leaving an annular residual air space. From passage 3 a port 20 leads to the outside of the pulsator, but is normally closed by a valve 22 carried by a lever 24 controlled by a spring 26 to effect normal closure of the port. A button 28 is provided which may be manually operated to compress the spring 26 and open the port 20.

Immediately before the pulsator is to be used, the valve 22 is opened by pressing the button 28. If there is any difference of pressure between the closed system and the atmosphere, this difference now disappears, and if the bellows have not been completely compressed such compression now takes place under the action of the springs 14 and 15. The result of this is that the system will contain a normal volume of air under the same pressure as the atmosphere, and the main condition for correct rate of pulsation is thereby fulfilled. Before the pulsator begins working, the valve 22 must, of course, be closed, which closure will take place automatically upon release of the button 28. As the pulsator in practice never works uninterruptedly for any very long period, the atmospheric conditions cannot, during operation, change so much that any serious disturbances occur. If such change occurs in the meantime, it is neutralized before the pulsator is used the next time by providing pressure equalization by opening the valve 22.

In order to minimize the risk of the operator's forgetting to press the button 28 before the operation is started, the button may be given some conspicuous appearance, for instance, by a high polish, color, or the like. Another possible arrangement is to arrange for automatic operation of the valve by means of some act which is connected with the use of the pulsator.

This latter is illustrated in Figures 5 and 6, in which there is illustrated at 44 a passage corresponding to the passage 3 of Figure 1, which passage should be opened to the atmosphere for pressure equalization. This passage 44 communicates with the atmospheric port 52 through a chamber 46 in which filtering material, indicated at 48, is located between screens 50 to prevent the entrance of dirt into the working parts. The port 52 is normally closed by a valve 54 carried by a lever 56 urged in a counter-clockwise position as viewed in Figure 5 by a compression spring 58. The port 52 is conveniently formed in a removable nut designed to close the chamber 46. When not in use, pulsators are ordinarily hung from a hook projecting from the pail cover. Accordingly, the lever 56 may conveniently carry a ring 60 by means of which the pulsator may be suspended from the conventional hook, the spring 58 being of such strength that when the pulsator is so suspended the spring will be compressed and the valve opened to permit equalization of pressure inside the bellows which, at this time, will be compressed by springs corresponding to 14 and 15, it being understood that the interior mechanism of the modification of Figure 5 may be identical with that of Figure 1.

Because the volume of the air inside the bellows is always effectively the same, the pulsator will always operate at the same speed.

What I claim and desire to protect by Letters Patent is:

1. In a milking machine pulsator having a variable volume member and having its rate of pulsation controlled by the flow of an enclosed quantity of air to and from that member, means to eliminate variations of speed due to changes in temperature and in barometric pressure comprising means, operable during idle time of the pulsator to set the variable volume member at a standard volume, means to equalize the pressure therein with that of the surrounding atmosphere, and means to prevent entrance of solid matter during said equalization.

2. In a milking machine pulsator having a variable volume member and having its rate of pulsation controlled by the flow of an enclosed quantity of air to and from that member, means to eliminate variations of speed due to changes in temperature and in barometric pressure comprising means, operable during idle time of the pulsator to set the variable volume member at a standard volume, and means to equalize the pressure therein with that of the surrounding atmosphere.

3. In a milking machine pulsator having a variable volume member and having its rate of pulsation controlled by the flow of an enclosed quantity of air to and from that member, means to eliminate variations of speed due to changes in temperature and in barometric pressure comprising means, operable during idle time of the pulsator to set the variable volume member at a standard volume, and manually operable means to open communication between the inside of the variable volume member and the surrounding atmosphere.

4. In a milking machine pulsator, adapted to be suspended when not in use, having a variable volume member and having its rate of pulsation controlled by the flow of an enclosed quantity of air to and from that member, means to eliminate variations of speed due to changes in temperature and in barometric pressure comprising means, operable during idle time of the pulsator to set the variable volume member at a standard volume, and means operable by the weight of the suspended pulsator to automatically open communication between the inside of the variable member and the surrounding atmosphere during idle periods of the pulsator.

5. In a milking machine pulsator having a pair of variable volume members and having its rate of pulsation controlled by the flow of an enclosed quantity of air between said members, means for eliminating variations in speed due to changes in temperature and in barometric pressure comprising means, operable during idle time of the pulsator to set varying volume members at a standard volume, and means to equalize the pressure within said members with that of the surrounding atmosphere.

ERIK AUGUST FORSBERG.